(12) United States Patent
Niwano et al.

(10) Patent No.: US 9,703,153 B2
(45) Date of Patent: Jul. 11, 2017

(54) LIQUID CRYSTAL DISPLAY

(71) Applicant: Mitsubishi Electric Corporation, Tokyo (JP)

(72) Inventors: Yasunori Niwano, Tokyo (JP); Toshiaki Fujino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/796,728

(22) Filed: Jul. 10, 2015

(65) Prior Publication Data

US 2016/0018706 A1   Jan. 21, 2016

(30) Foreign Application Priority Data

Jul. 18, 2014   (JP) .................. 2014-147354

(51) Int. Cl.
| | |
|---|---|
| *G02F 1/1343* | (2006.01) |
| *G02F 1/13* | (2006.01) |
| *G02F 1/1362* | (2006.01) |
| *G02F 1/1333* | (2006.01) |

(52) U.S. Cl.
CPC ...... *G02F 1/134363* (2013.01); *G02F 1/1309* (2013.01); *G02F 1/136204* (2013.01); *G02F 2001/133388* (2013.01); *G02F 2001/134372* (2013.01); *G02F 2201/121* (2013.01); *G02F 2201/50* (2013.01)

(58) Field of Classification Search
CPC ......... G02F 1/136204; G02F 1/134363; G02F 1/1309; G02F 2001/133388; G02F 2001/133397; G02F 2001/134372; G02F 2201/121; H01L 51/524; H01L 51/5246
See application file for complete search history.

(56) References Cited

U.S. PATENT DOCUMENTS

| | | | |
|---|---|---|---|
| 2006/0050206 A1* | 3/2006 | Suzuki ................. | G02F 1/1309 349/110 |
| 2010/0045920 A1* | 2/2010 | Kwak et al. .......... | G02F 1/1339 349/153 |

(Continued)

FOREIGN PATENT DOCUMENTS

| | | |
|---|---|---|
| JP | 2004333673 | * 11/2004 |
| JP | 2005-275054 A | 10/2005 |
| JP | 2011-170134 A | 9/2011 |

*Primary Examiner* — Michael Caley
*Assistant Examiner* — Jonathan Y Jung
(74) *Attorney, Agent, or Firm* — Studebaker & Brackett PC (57) ABSTRACT

A liquid crystal display according to the present invention is of the lateral electric field type and includes an array substrate having a plurality of pixels arranged in a matrix state, a counter substrate disposed opposite to the array substrate, and liquid crystal enclosed between the array substrate and the counter substrate by a sealing material. The liquid crystal display has a display area for an image and a frame area surrounding the display area. The liquid crystal display further includes an inspection circuit or a protection circuit disposed in the frame area of the array substrate, and a counter electrode disposed in the frame area of the counter substrate and overlapped with entirety of the inspection circuit or the protection circuit in a planar view. The counter electrode is equal in electric potential to a common electrode of the array substrate.

15 Claims, 5 Drawing Sheets

(56) References Cited

U.S. PATENT DOCUMENTS

| | | | |
|---|---|---|---|
| 2010/0079694 A1* | 4/2010 | Yoshida et al. | G02F 1/134363 349/40 |
| 2012/0212684 A1* | 8/2012 | Ochiai et al. | G02F 1/13458 348/790 |
| 2013/0114014 A1* | 5/2013 | Kwak | G02F 1/13454 349/43 |
| 2014/0176838 A1* | 6/2014 | Hong | G02F 1/134363 349/33 |

* cited by examiner

LIQUID CRYSTAL DISPLAY

BACKGROUND OF THE INVENTION

Field of the Invention

The present invention relates to a liquid crystal display, and particularly relates to a liquid crystal display of the lateral electric field type.

Description of the Background Art

A liquid crystal display typically includes a backlight as a light source. The backlight is disposed opposite to a display screen of the liquid crystal display provided with a pair of substrates. The liquid crystal display causes a light beam emitted from the backlight to transmit therethrough so as to display a desired still or moving image. The two substrates enclose liquid crystal therebetween. A first one of the substrates is an array substrate having a plurality of pixels arranged in a matrix state. A second one of the substrates is a counter substrate provided with a color filter, a black matrix (light shielding film), and the like. The array substrate and the counter substrate are stuck to each other by a sealing material. The liquid crystal display has a display area and a non-display area (also called a frame area) surrounding the display area. The non-display area is provided with the black matrix serving as a light shielding layer to suppress leakage of a light beam emitted from the backlight.

In recent years, the in-plane switching (IPS) mode and the fringe field switching (FFS) mode of the lateral electric field type, which is excellent in view angle property have been widely adopted in place of the twisted nematic (TN) mode according to the conventional vertical electric field system. A liquid crystal display in the IPS mode or the FFS mode includes an array substrate (first substrate) and a counter substrate (second substrate) which are disposed opposite to each other with a liquid crystal layer being interposed therebetween. The array substrate is provided, on the surface facing the liquid crystal layer, with a pixel electrode and a common electrode so as to be insulated from each other. The pixel electrode and the common electrode are configured to drive the liquid crystal. The pixel electrode and the common electrode apply, to liquid crystal molecules, an electric field in a substantially transverse direction (along the surface). The paired electrodes in the IPS mode are not overlapped with each other in a planar view. In contrast, the paired electrodes in the FFS mode are overlapped with each other in a planar view.

In the liquid crystal display in the IPS mode or the FFS mode, the first electrode is provided with the pixel electrode and a counter electrode, and the second electrode is provided, on the surface facing the liquid crystal, with insulating films such as a black matrix made of organic resin, an overcoat, a color filter, and the like. Unlike the liquid crystal display in the TN mode, the counter substrate is provided with no counter electrode (common electrode). When static electricity is induced to the counter substrate from the outside, an electric field generated by the static electricity is applied to the liquid crystal layer and causes abnormal displaying.

The first substrate is provided, in the frame area, with an inspection circuit (e.g. a lighting inspection circuit) or a protection circuit (e.g. a short ring circuit). Gate lead-out wires provided to switch the circuit generates an electric field that causes electric potential fluctuation of the second substrate and uneven displaying.

In view of the above problem, Japanese Patent Application Laid-Open No. 2005-275054 discloses provision of a shield electrode (conductive film) configured to shield an electric field, on gate lead-out wires of an array substrate with an insulating film being interposed therebetween, to prevent uneven displaying. Japanese Patent Application Laid-Open No. 2011-170134 discloses division of a black matrix in a non-display area to prevent entry of static electricity of the black matrix.

In the configuration according to Japanese Patent Application Laid-Open No. 2005-275054, a shield electrode cannot be provided to a connection conversion part, which is disposed at a connection between a wire layer for an inspection circuit, a protection circuit, or the like and a gate wire. The connection conversion part in a panel with high dot density has high density and a larger area. The defect mentioned above is caused around the display area in the vicinity of the connection conversion part.

SUMMARY OF THE INVENTION

An object of the present invention is to provide a liquid crystal display of the lateral electric field type, which suppresses uneven displaying caused in a display area in the vicinity of a connection between a wire layer for an inspection circuit, a protection circuit, or the like and a gate wire.

The present invention provides a liquid crystal display of the lateral electric field type, including an array substrate provided with a plurality of pixels arranged in a matrix state, a counter substrate disposed opposite to the array substrate, and liquid crystal enclosed between the array substrate and the counter substrate by a sealing material. The liquid crystal display has a display area for an image and a frame area surrounding the display area. The liquid crystal display according to the present invention further includes an inspection circuit or a protection circuit disposed in the frame area of the array substrate, and a counter electrode disposed in the frame area of the counter substrate and overlapped with entirety of the inspection circuit or the protection circuit in a planar view. The counter electrode is equal in electric potential to a common electrode on the array substrate.

In the liquid crystal display according to the present invention, the counter electrode is provided on the counter substrate and is conductive with the common electrode on the array substrate so that the counter substrate is shielded from a leakage electric field generated by the inspection circuit and a wire of the inspection circuit. The counter substrate is thus less likely to be influenced by a leakage electric field from the inspection circuit and the wire of the inspection circuit. This configuration accordingly suppresses uneven displaying in the display area.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
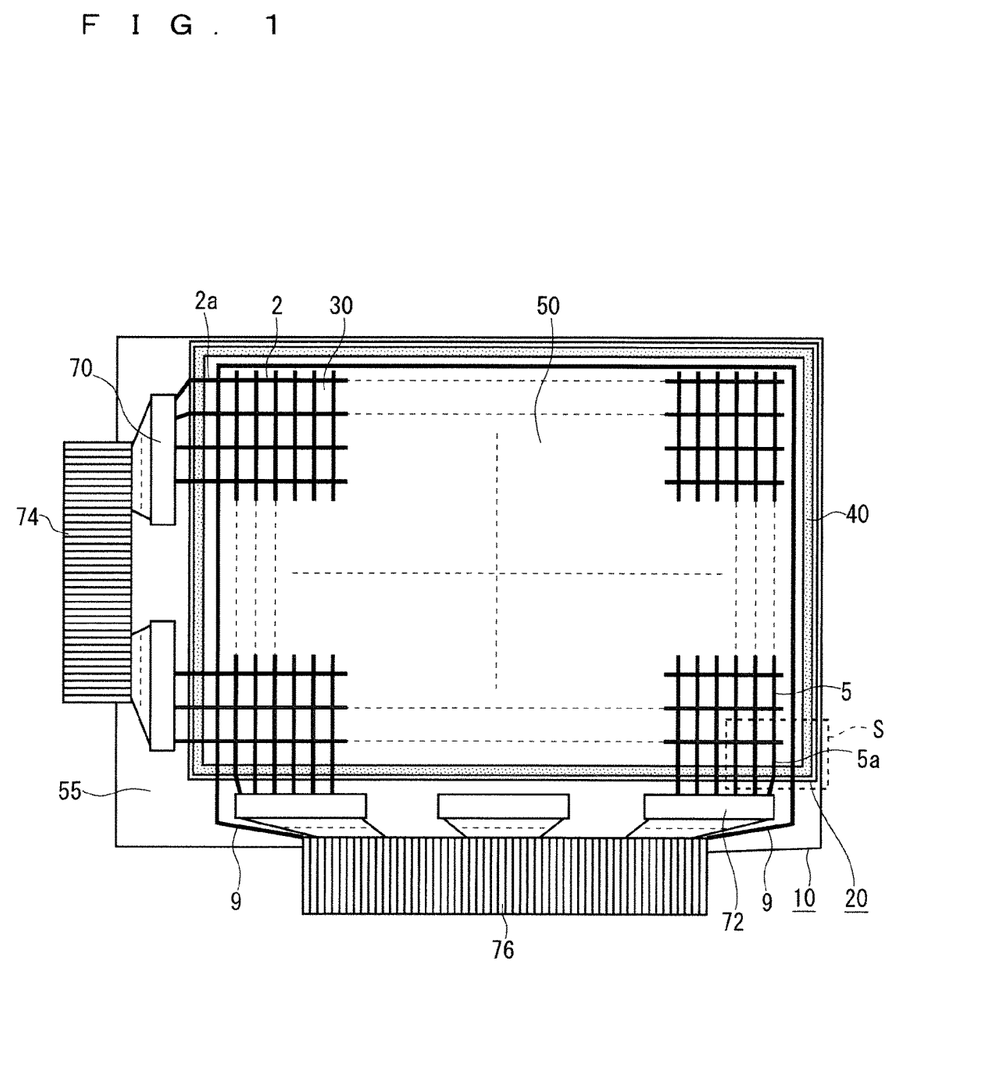
FIG. 1 is a plan view of a liquid crystal display according to a first preferred embodiment.

FIG. 1 is a plan view schematically depicting a configuration of a liquid crystal display according to the first preferred embodiment. The liquid crystal display according to the present preferred embodiment is configured in accordance with the lateral electric field type (e.g. the IPS mode or the FFS mode). A liquid crystal display 100 includes a liquid crystal panel provided with an array substrate 10 and a counter substrate 20 that is disposed opposite to the array substrate 10. The array substrate 10 and the counter substrate 20 are stuck to each other by a sealing material 40, and liquid crystal is held between the array substrate 10 and the counter substrate 20.

The array substrate 10 is provided with pixels 30 arranged in a matrix state. The pixels 30 each include a gate wire 2, a source wire 5, a TFT, a pixel electrode (not depicted), and the like. The array substrate 10 has a display area 50 provided, near the outer portion, with a common wire 9.

The counter substrate 20 is provided with a color filter 24, a black matrix 26, and the like. Although not depicted in FIG. 1, the liquid crystal panel has surfaces respectively to which a deflection plate and a phase plate are stuck, and to which a backlight, an external circuit, a housing, and the like are attached. The liquid crystal display 100 is thus completed.

The array substrate 10 includes an insulating substrate 1 made of glass, plastic, or the like and provided thereabove with the display area 50 and a frame area 90 surrounding the display area 50. In the frame area 90, a plurality of connecting terminals (not depicted) is mounted with a gate wire drive circuit 70 and a source wire drive circuit 72 in accordance with the chip on glass (COG) mounting technology. The insulating board 1 is provided, at an end thereof, with a plurality of connecting terminals (not depicted) for flexible boards 74 and 76 connected to an external circuit configured to supply each of the gate wire drive circuit 70 and the source wire drive circuit 72 with a control signal, a clock pulse, image data, drive voltage, or the like.

There are provided a large number of gate lead-out wires 2a or source lead-out wires 5a extending from the gate wires 2 or the source wires 5 in the display area 50 to an output unit of the gate wire drive circuit 70 or the source wire drive circuit 72 over the sealing material 40. And there are provided a large number of input wires connecting an input unit of the gate wire drive circuit 70 or the source wire drive circuit 72 and the plurality of connecting terminals for the flexible boards 74 and 76 disposed at the end of the insulating board 1. FIG. 1 depicts only part of these wires in order for simplification of the figure. A small panel has a relatively small number of wires in total, and is thus often provided with a drive circuit integrally functioning as the gate wire drive circuit 70 and the source wire drive circuit 72. The flexible boards 74 and 76 are also often integrated with each other into a single flexible board.

Figure 2:
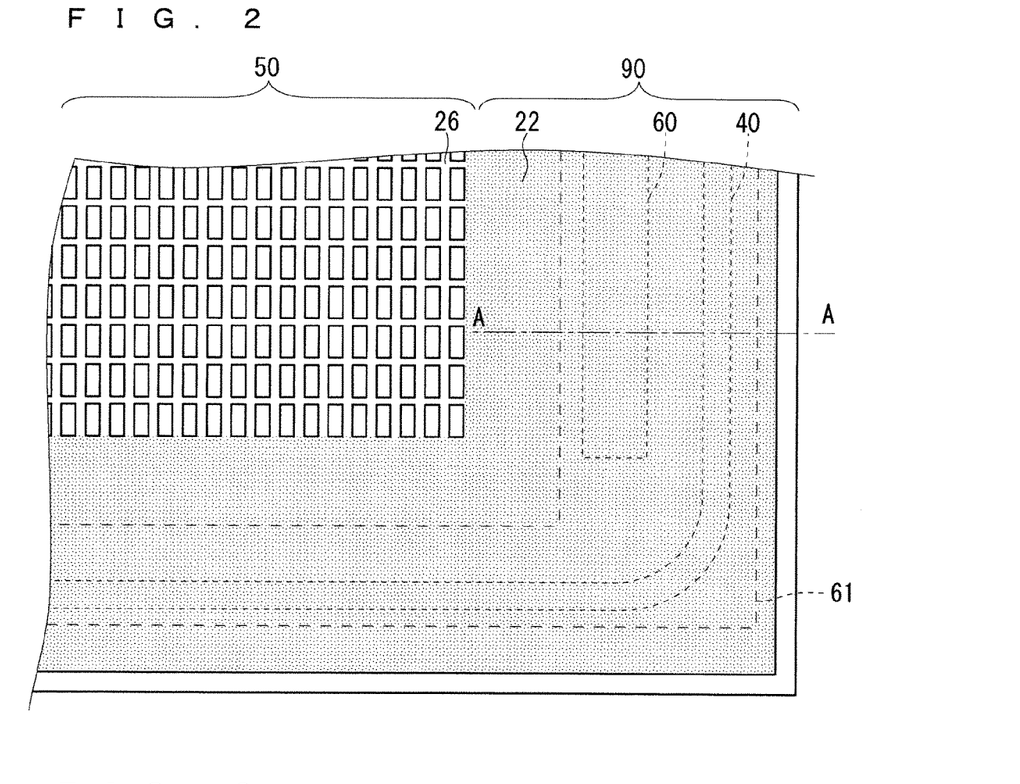
FIG. 2 is an enlarged view of an area S in the liquid crystal display according to the first preferred embodiment.
Figure 3:
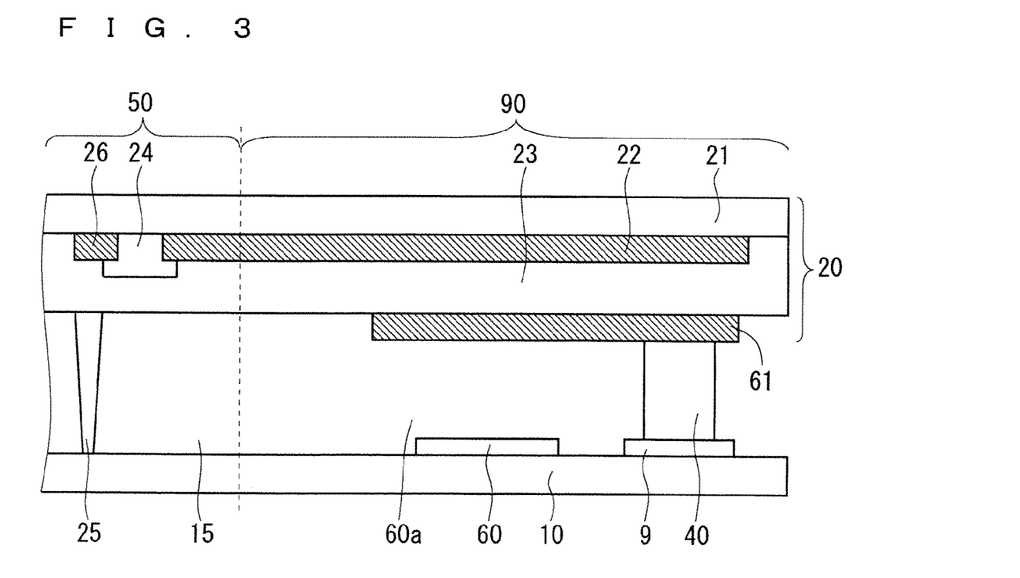
FIG. 3 is a sectional view taken along line AA indicated in FIG. 2, of the liquid crystal display according to the first preferred embodiment.

FIG. 2 is a plan view of an enlarged area S indicated in FIG. 1. FIG. 3 is a sectional view taken along line AA indicated in FIG. 2. FIG. 2 does not depict the black matrix 26, an overcoat 23, and the like on the counter substrate 20, in order for simplification of the figure. The display area 50 indicated in FIG. 2 has the plurality of pixels 30 arranged in a matrix state. The pixels 30 are to be described in detail later in terms of the configuration.

As depicted in FIG. 2, the common wire 9 and an inspection circuit 60 are disposed on the periphery of the display area 50. The inspection circuit 60 has an exposed upper electrode. For example, the inspection circuit 60 functions as a lighting inspection circuit configured to inspect lighting of the respective pixels 30. The inspection circuit 60 is switched by the TFT. The gate wire used for driving the inspection TFT receives OFF electric potential so that inspection is not performed while the liquid crystal display is in use. The gate wire 2 receives an OFF signal by way of an upper electrode 8. The inspection circuit 60 can be replaced with a protection circuit. The protection circuit can be a short ring circuit.

The counter substrate 20 includes an insulating substrate 21 made of glass, plastic, or the like. The black matrix 26 made of black organic resin, a light shielding layer 22, the color filter 24, and the overcoat 23 made of transparent organic resin are laminated on the insulating substrate 21. The black matrix 26 and the light shielding layer 22 are made of a same material. Each of the pixels 30 typically corresponds to one of three primary colors, namely, red, blue, and green, of the color filter. The color filter can have four or more primary colors for better color reproduction.

The counter substrate 20 in the liquid crystal display of the lateral electric field type is typically provided, on the surface facing the liquid crystal, with no counter electrode (common electrode) made of a transparent oxide conductive film such as ITO. The counter substrate 20 is provided, on the surface facing the liquid crystal, with an insulating film made of a dielectric. Gate electric potential of the array substrate 10 generates an electric field that leaks from the inspection circuit 60 or the protection circuit and causes electric potential fluctuation of the insulating substrate 21, the black matrix 26, the light shielding layer 22, the overcoat 23, the color filter 24, or the like of the counter substrate 20. This electric potential fluctuation causes uneven displaying around the display area 50 in the vicinity of the leakage electric field.

In order to solve this problem, the liquid crystal display according to the first preferred embodiment includes a counter electrode 61 that is provided on the counter substrate 20 at a position opposite to the inspection circuit 60. The counter electrode 61 functions as a shield electrode that inhibits electric field generated by OFF electric potential applied to the upper electrode exposed to the inspection circuit 60 from expanding to the display area 50.

The counter electrode 61 is connected to the common wire 9 by way of conductive particles mixed into the sealing material 40. The sealing material 40 has a sealing function of sticking the array substrate 10 and the counter substrate 20 to enclose liquid crystal 15. The sealing material 40 is typically made of epoxy resin or the like and can be of the thermosetting type or the photosetting type. The sealing material 40 is required to prevent impurities from dissolving into the liquid crystal 15. The counter electrode 61 and the common wire 9 can be connected to each other by Ag paste or the like provided separately from the sealing material 40. The liquid crystal 15 can be injected by means of either vacuum injection or instillation.

Figure 4:
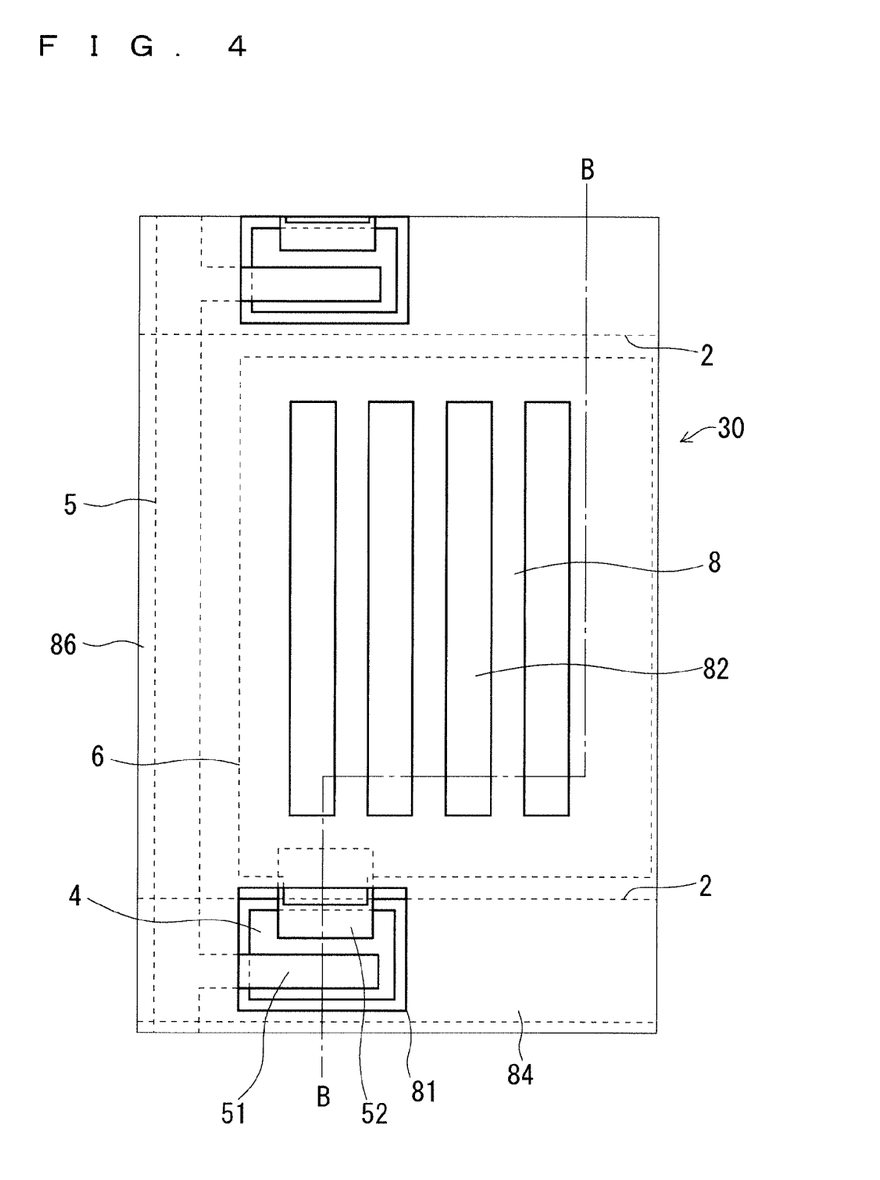
FIG. 4 is a plan view of a pixel in the liquid crystal display according to the first preferred embodiment.
Figure 5:
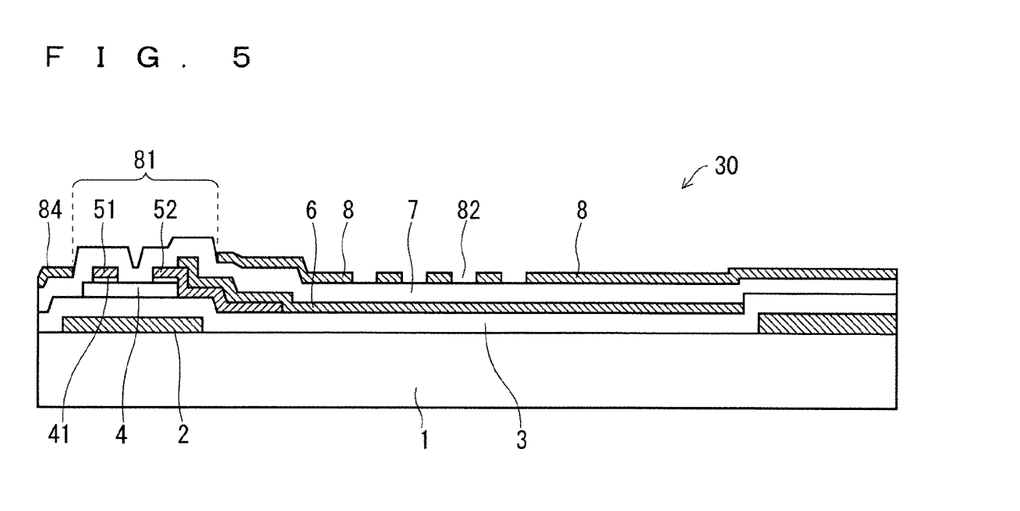
FIG. 5 is a sectional view taken along line BB indicated in FIG. 4, of the liquid crystal display according to the first preferred embodiment.

FIG. 4 is a plan view of one of the pixels 30 disposed on the array substrate 10 according to the first preferred embodiment. FIG. 5 is a sectional view taken along line BB indicated in FIG. 4. The liquid crystal display according to the first preferred embodiment is in the FFS mode. The pixel 30 includes a lower electrode 6 functioning as a pixel electrode, and the upper electrode 8 functioning as the counter electrode. In the pixel 30, the insulating substrate 1 made of glass, plastic, or the like is provided thereabove with the gate wire 2, the gate lead-out wires 2a, and the like, which are each made of metal such as Al, Cr, Mo, Ti, Ta, W, Ni, Cu, Au, or Ag, alloy thereof, or a lamination film thereof. Provided thereabove is an inorganic gate insulating film 3 such as an oxide film or a nitride film. The gate insulating film 3 disposed above part of the gate wire 2 is provided thereabove with a semiconductor film 4 and an ohmic contact film 41 obtained by injecting impurities into the semiconductor film 4. The semiconductor film 4 and the ohmic contact film 41 are laminated to form an island shape. The gate insulating film 3 is provided thereabove with the source wire 5, the source lead-out wire 5a, and the like, which are each made of metal such as Al, Cr, Mo, Ti, Ta, W, Ni, Cu, Au, or Ag, alloy thereof, or a lamination film thereof, so as to cross the gate wire 2. The common wire 9 disposed at the same layer with the source wire 5 is formed simultaneously with the source wire 5 in the production step. A source electrode 51 and a drain electrode 52 disposed at the same layer with the source wire 5 are provided so as to be overlapped with the ohmic contact film 41. The ohmic contact film 41 exposed from the source electrode 51 and the drain electrode 52 is removed in the production step. The ohmic contact film 41 disposed between the source electrode 51 and the drain electrode 52 is also removed to configure a channel unit of the TFT. The gate wire 2 disposed below the channel unit functions as a gate electrode, to provide the TFT functioning as a switching element.

The semiconductor film 4 and the ohmic contact film 41 are provided in the TFT area and can also extend along the source wire 5 so as to be disposed below the source wire 5. The semiconductor film 4 and the ohmic contact film 41 can be further provided in an island shape at a position where the gate wire 2 and the source wire 5 cross each other, in order to suppress disconnection of the source wire 5. The lower electrode 6 in a plate shape functions as a pixel electrode and is made of a transparent oxide conductive film such as ITO in a case where the lower electrode 6 is of the transmission type. The lower electrode 6 of the reflection type can be made of metal such as Al, Ag, or Pt, alloy thereof, or a lamination film thereof, having a surface provided with a conductive film of a high reflection factor. The lower electrode 6 is partially provided so as to be laminated on the drain electrode 52 and be electrically connected thereto. Alternatively, the lower electrode 6 can be partially provided below the drain electrode 52 so as to be electrically connected thereto. The source wire 5, the TFT, the lower electrode 6, and the like are covered with an inorganic film such as an oxide film or a nitride film, an insulating film of organic resin, or a protection film 7 including laminated films thereof.

The protection film 7 is provided thereabove with the upper electrode 8 made of a transparent oxide conductive film such as ITO. The upper electrode 8 has a slit shape (hole shape) provided with an opening 82, a comb shape (provided with an opening 82 having an open end), or a stripe shape. The upper electrode 8 is a counter electrode, and common electric potential is applied to the upper electrode 8. The upper electrode 8 generates a fringe electric field between the upper electrode 8 and the lower electrode 6 through the protection film 7 in the area of the opening 82 to drive the liquid crystal 15. The upper electrode 8 according to the first preferred embodiment is connected to the upper electrodes 8 of the adjacent pixels 30 by connections 84 and 86 at the same layer with the upper electrodes 8 along the source wire 5 (longitudinally) and along the gate wire 2 (laterally). The connections 84 and 86 cover substantially entirety of the gate wire 2 and the source wire 5 and form a lattice (mesh) shape, so as to reduce resistance of the upper electrode 8 and shield an electric field generated by the gate wire 2 and the source wire 5 toward the liquid crystal 15.

The upper electrode 8 or the connections 84 and 86 on the TFT are further provided with an opening 81. The opening 81 is provided so that common electric potential of the upper electrode 8 does not affect the property of the TFT. The opening 81 can possibly cause leakage of an electric field generated by the gate wire 2 toward the liquid crystal 15. The opening 81 is thus minimized in size, or may not be provided on the TFT.

The connections 84 and 86 of the pixel 30 extend naturally at ends of the display area 50 so as to be connected to the common wire 9. The connections 84 and 86 are disposed at the same layer with the upper electrode 8. The connections 84 and 86 and the common wire 9 are connected to each other in the area inside the sealing material 40 by way of a contact hole 13 provided in the protection film 7.

The connection 86 disposed between the end of the display area 50 and the common wire 9 also shields an electric field generated by the gate lead-out wires 2a. The contact hole 13 can be designed appropriately in terms of its size, shape, number, and position.

In the step of assembling the liquid crystal panel, an alignment film (not depicted) made of organic resin such as polyimide is applied to each of the array substrate 10 and the counter substrate 20 and alignment processing is then performed by means of rubbing, photo alignment, or the like so that molecules of the liquid crystal 15 is directed in a predetermined direction. The array substrate 10 and the counter substrate 20 are overlapped with each other such that the alignment films are disposed opposite to each other and are stuck to each other by the sealing material 40 provided to surround the display area 50 with a gap of about several micrometers provided by a spacer 25 made of organic resin or the like. The liquid crystal 15 is enclosed in the space inside the sealing material 40.

The liquid crystal panel thus formed is then provided, respectively on the surfaces, with the polarizing plate and the phase plate, and is mounted with a scanning line drive circuit 70, a signal line drive circuit 72, and the flexible boards 74 and 76. The liquid crystal display 100 of the transmission type is completed by attaching an external circuit configured to supply the liquid crystal panel with various electric signals and a backlight unit to the rear surface of the liquid crystal panel and accommodating the liquid crystal panel in the housing.

The inspection circuit 60 or the protection circuit can be surrounded by the sealing material 40 and a wall 62 so as to be disposed in a vacuum area, as in a second preferred embodiment (FIG. 6) to be described later. The inspection circuit 60 or the protection circuit can be still alternatively surrounded by the wall 62 so as to be disposed in a vacuum area, as in a third preferred embodiment (FIG. 7) to be described later. The inspection circuit 60 or the protection circuit is disposed in the vacuum area to improve insulation. In this configuration, electrical charges are less likely to be induced to the counter substrate 20. The counter substrate 20 is further less likely to be influenced by a leakage electric field from the inspection circuit 60 or the inspection circuit. This configuration further suppresses uneven displaying in the display area 50.

Effects

The liquid crystal display according to the first preferred embodiment is of the lateral electric field type and includes the array substrate 10 having the plurality of pixels 30 arranged in a matrix state, the counter substrate 20 disposed opposite to the array substrate 10, and the liquid crystal 15 enclosed between the array substrate 10 and the counter substrate 20 by the sealing material 40. The liquid crystal display has the display area 50 for an image and the frame area 90 surrounding the display area 50. The liquid crystal display further includes the inspection circuit 60 or the protection circuit disposed in the frame area 90 of the array substrate 10, and the counter electrode 61 disposed in the frame area 90 of the counter substrate 20 and overlapped with entirety of the inspection circuit 60 or the protection circuit in a planar view. The counter electrode 61 is equal in electric potential to the common electrode of the array substrate 10.

In the liquid crystal display according to the first preferred embodiment, the counter electrode 61 is provided on the counter substrate 20 and is conductive with the common electrode on the array substrate 10 so that the counter substrate 20 is shielded from a leakage electric field generated by the inspection circuit 60. The counter substrate 20 is thus less likely to be influenced by a leakage electric field from the inspection circuit 60 and the wire of the inspection circuit 60. This configuration accordingly suppresses uneven displaying in the display area 50.

The liquid crystal display according to the first preferred embodiment further includes the light shielding layer 22 disposed in the frame area 90 of the counter substrate 20, and the counter electrode 61 is provided closer to the liquid crystal 15 than the light shielding layer 22.

The counter electrode 61 shields the leakage electric field, so that the light shielding layer 22 can be made of a material having relatively low resistivity (e.g. about $10^{11}$ Ω·cm). A material of high carbon density and high optical density (an OD value) can be selected for efficient light shielding.

The liquid crystal display according to the first preferred embodiment can further include the wall 62 disposed between the array substrate 10 and the counter substrate 20 to surround the inspection circuit 60 or the protection circuit between the sealing material 40 and the wall 62. In this configuration, an area surrounded by the wall 62 and the sealing material 40 is a vacuum area 60a and the inspection circuit 60 or the protection circuit is disposed in the vacuum area.

The inspection circuit 60 is disposed in the vacuum area to improve insulation. In this configuration, electrical charges are less likely to be induced to the counter substrate 20. The counter substrate 20 is thus less likely to be influenced by a leakage electric field from the inspection circuit 60. This configuration accordingly suppresses uneven displaying in the display area 50. Furthermore, impurity ions moving in the liquid crystal 15 do not segregate. As to be mentioned in the second preferred embodiment, generation of vacuum bubbles can be also suppressed in a case where the liquid crystal display is in low temperature environment.

The liquid crystal display according to the first preferred embodiment can further include the wall 62 disposed between the array substrate 10 and the counter substrate 20 to surround the inspection circuit 60 or the protection circuit. In this configuration, an area surrounded by the wall 62 is the vacuum area 60a and the inspection circuit 60 or the protection circuit is disposed in the vacuum area. In addition to the effects described above, impurities generated from the sealing material 40 can be prevented from dispersing toward the inspection circuit 60.

In the liquid crystal display according to the first preferred embodiment, the inspection circuit 60 is a circuit that inspects lighting of the pixels 30. Even in the case where the inspection circuit 60 is disposed to inspect lighting of the pixels 30, it is possible to suppress uneven displaying in the display area 50 due to a leakage electric field from the inspection circuit 60.

In the liquid crystal display according to the first preferred embodiment, the protection circuit is a short ring circuit. Even in the case where the short ring circuit is provided as the protection circuit, it is possible to suppress uneven displaying in the display area 50 due to a leakage electric field from the protection circuit.

Second Preferred Embodiment

Figure 6:
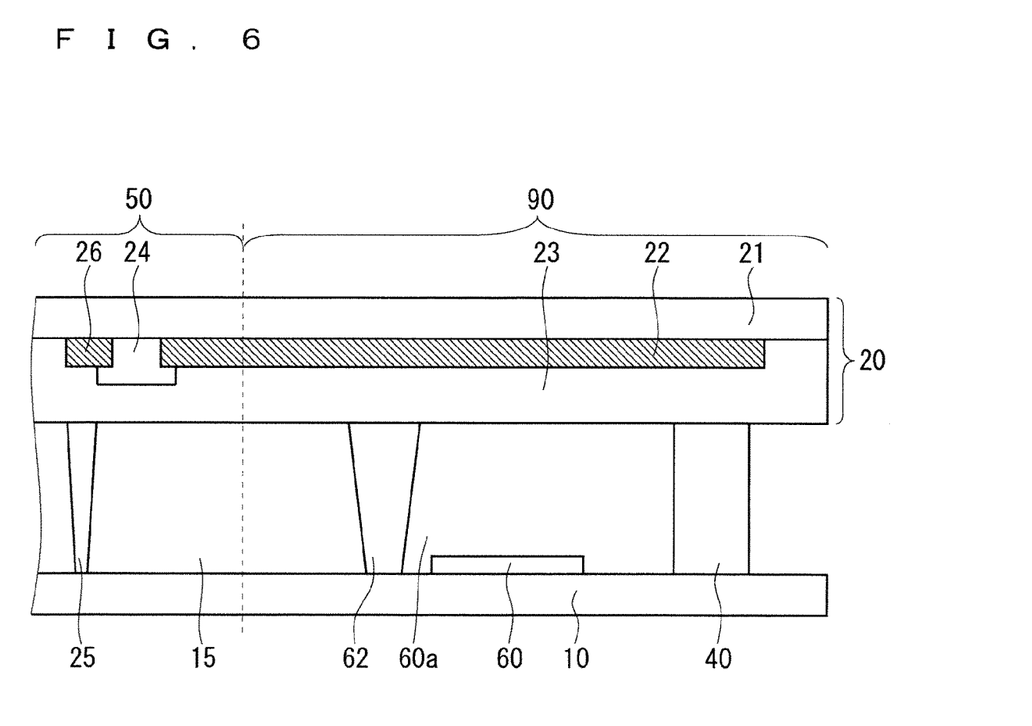
FIG. 6 is a sectional view of a frame area and its vicinity of a liquid crystal display according to a second preferred embodiment.

FIG. 6 is a sectional view of an inspection circuit 60 and its vicinity of a liquid crystal display according to the second preferred embodiment. A wall 62 is provided between the array substrate 10 and the counter substrate 20 in the second preferred embodiment. As depicted in FIG. 6, the wall 62 is provided to surround the inspection circuit 60 together with the sealing material 40. The wall 62 is formed simultaneously with the spacer 25 in a manufacturing process.

The inspection circuit 60 can be separated from the liquid crystal 15 by the wall 62 thus provided. The area 60a surrounded with the array substrate 10, the counter substrate 20, the wall 62, and the sealing material 40 is kept in a vacuum state. The liquid crystal 15 is dripped only at the position of the display area 50 in the production step. The liquid crystal 15 is not dripped in the area 60a surrounded by the wall 62 and the sealing material 40. The array substrate 10 and the counter substrate 20 are then accommodated in a chamber and the chamber is evacuated. The array substrate 10 and the counter substrate 20 are stuck to each other in this state. The liquid crystal 15 expands in the display area 50. The area 60a surrounded by the wall 62 and the sealing material 40 is made in a vacuum state.

Effects

The liquid crystal display according to the present preferred embodiment is of the lateral electric field type and includes the array substrate 10 having the plurality of pixels 30 arranged in a matrix state, the counter substrate 20 disposed opposite to the array substrate 10, and the liquid crystal 15 enclosed between the array substrate 10 and the counter substrate 20 by the sealing material 40. The liquid crystal display has the display area 50 for an image and the frame area 90 surrounding the display area 50. The liquid crystal display further includes the inspection circuit 60 or the protection circuit disposed in the frame area 90 of the array substrate 10, and the wall 62 disposed between the array substrate 10 and the counter substrate 20 to surround the inspection circuit 60 or the protection circuit between the wall 62 and the sealing material 40. An area surrounded by the wall 62 and the sealing material 40 is the vacuum area 60a, and the inspection circuit 60 or the protection circuit in the area 60a is disposed in the vacuum area.

In the liquid crystal display according to the second preferred embodiment, the inspection circuit 60 is disposed in the vacuum space to improve insulation. In this configuration, electrical charges are less likely to be induced to the counter substrate 20. The counter substrate 20 is thus less likely to be influenced by a leakage electric field from the inspection circuit 60. This configuration accordingly suppresses uneven displaying in the display area 50. Furthermore, impurity ions moving in the liquid crystal 15 do not segregate.

The area 60a surrounded by the wall 62 can be provided with a communicating channel to the display area 50, in the form of a gap or an opening partially provided in the wall 62 so as to spatially communicate with the display area 50. Also in this case, the liquid crystal 15 of an amount corresponding to the volume of the display area 50 is dripped only at the position of the display area 50 in the production step, so that the liquid crystal 15 will not enter the area 60a surrounded by the wall 62 and the area 60a is made in a vacuum state. Although the area 60a is a space not provided with the liquid crystal 15 in the liquid state, the area 60a can be in an imperfect vacuum state and be filled with gas of a volatile component in the liquid crystal 15. If the area 60a surrounded by the wall 62 is a space not containing the liquid crystal 15 in the liquid state, the desired effects of the present invention can be achieved similarly to the case where the area 60a is in a vacuum state. Accordingly, the present application also regards the state where the liquid crystal 15 in the liquid state is not contained as being in a vacuum state. Furthermore, in the exemplified case where the area 60a surrounded by the wall 62 spatially communicates with the display area 50, some of the liquid crystal 15 can move between the area 60a and the display area 50. The area 60a thus serves as a buffer area for adaptation to a volume change caused by a temperature change of the liquid crystal 15 disposed in the display area 50. Vacuum bubbles generated by volume reduction of the liquid crystal 15 can be suppressed in the case where the liquid crystal display has low temperature.

Third Preferred Embodiment

Figure 7:
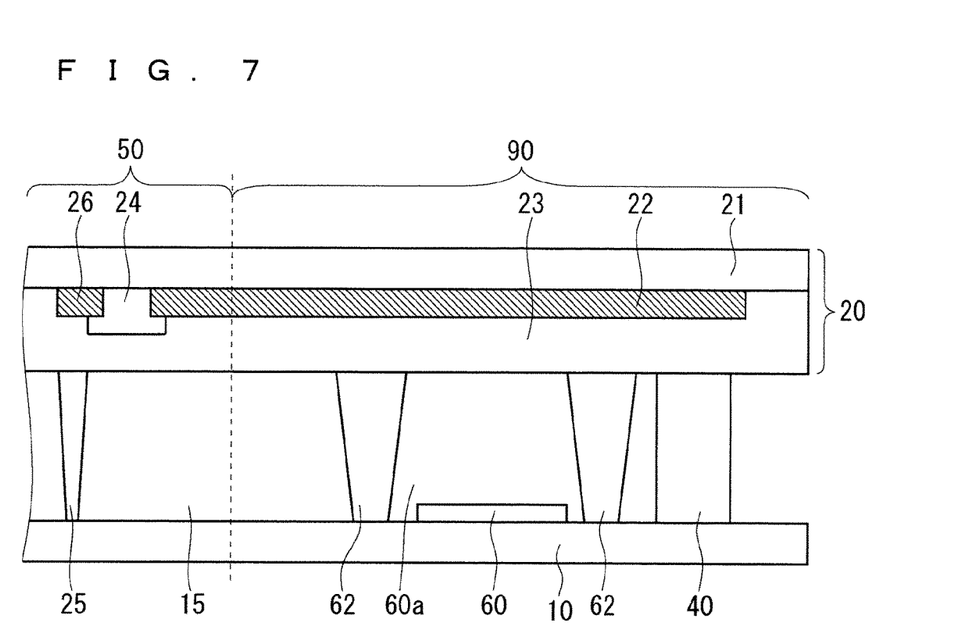
FIG. 7 is a sectional view of a frame area and its vicinity of a liquid crystal display according to a third preferred embodiment.

FIG. 7 is a sectional view of an inspection circuit 60 and its vicinity of a liquid crystal display according to the third preferred embodiment. The wall 62 and the sealing material 40 surround the inspection circuit 60 between the array substrate 10 and the counter substrate 20 in the second preferred embodiment. Only the wall 62 surrounds the inspection circuit 60 between the array substrate 10 and the counter substrate 20 in the third preferred embodiment. The wall 62 is provided also between the inspection circuit 60 and the sealing material 40.

Similarly to the second preferred embodiment, the area 60a surrounded by the wall 62 is in a vacuum state, and the inspection circuit 60 or the protection circuit is disposed in the vacuum area 60a.

Effects

The liquid crystal display according to the third preferred embodiment is of the lateral electric field type and includes the array substrate 10 having the plurality of pixels 30 arranged in a matrix state, the counter substrate 20 disposed opposite to the array substrate 10, and the liquid crystal 15 enclosed between the array substrate 10 and the counter substrate 20 by the sealing material 40. The liquid crystal display has the display area 50 for an image and the frame area 90 surrounding the display area 50. The liquid crystal display further includes the inspection circuit 60 or the protection circuit disposed in the frame area 90 of the array substrate 10, and the wall 62 disposed between the array substrate 10 and the counter substrate 20 to surround the inspection circuit 60 or the protection circuit. An area surrounded by the wall 62 is the vacuum area 60a, and the inspection circuit 60 or the protection circuit is disposed in the vacuum area.

In addition to the effects achieved in the second preferred embodiment, impurities generated from the sealing material 40 can be prevented from dispersing toward the inspection circuit 60 in the liquid crystal display according to the third preferred embodiment.

Fourth Preferred Embodiment

Figure 8:
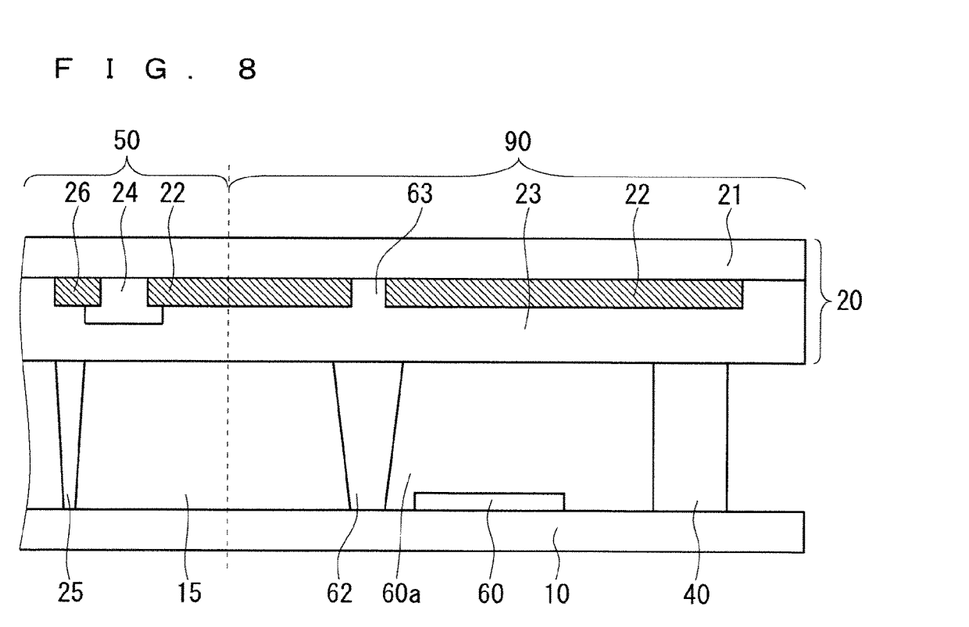
FIG. 8 is a sectional view of a frame area and its vicinity of a liquid crystal display according to a fourth preferred embodiment.

FIG. 8 is a sectional view of an inspection circuit 60 and its vicinity of a liquid crystal display according to the fourth preferred embodiment. The liquid crystal display according to the fourth preferred embodiment is obtained by further providing the light shielding layer 22 in the frame area 90 with a slit 63 in the liquid crystal display according to the second or third preferred embodiment. The other configurations are the same as those according to the second or third preferred embodiment and will not be described repeatedly.

The polarizing plate and the phase plate stuck respectively to the surfaces of the liquid crystal panel are disposed to cover the slit 63 so as to prevent leakage of a light beam through the slit 63.

Effects

The liquid crystal display according to the fourth preferred embodiment further includes the light shielding layer 22 disposed at the counter substrate 20, and the light shielding layer 22 is provided with the slit 63 between the display area 50 and the frame area 90.

Electrical charges are likely to be induced to the light shielding layer 22 provided above the inspection circuit 60. The light shielding layer 22 provided in the frame area 90 is provided with the slit 63 between the display area 50 and the frame area 90, so as to further suppress induction of electrical charges to the light shielding layer 22 in the display area 50.

While the invention has been shown and described in detail, the foregoing description is in all aspects illustrative and not restrictive. It is therefore understood that numerous modifications and variations can be devised without departing from the scope of the invention.

What is claimed is:
1. A liquid crystal display of a lateral electric field type, comprising:
    an array substrate having a plurality of pixels arranged in a matrix state;
    a counter substrate disposed opposite to said array substrate; and
    liquid crystal enclosed between said array substrate and said counter substrate by a sealing material;
    said liquid crystal display having a display area for an image and a frame area surrounding the display area;
    said liquid crystal display further comprising:

an inspection circuit or a protection circuit disposed in said frame area of said array substrate; and a counter electrode disposed in said frame area of said counter substrate and overlapped with entirety of said inspection circuit or said protection circuit in a planar view; wherein said counter electrode is equal in electric potential to a common electrode of said array substrate, and said counter electrode does not extend into said display area.

2. The liquid crystal display according to claim 1, further comprising:

a light shielding layer disposed in said frame area of said counter substrate; wherein said counter electrode is disposed closer to said liquid crystal than said light shielding layer.

3. The liquid crystal display according to claim 1, further comprising:

a wall disposed between said array substrate and said counter substrate to surround said inspection circuit or said protection circuit between said sealing material and the wall; wherein an area surrounded by said wall and said sealing material is a vacuum area, and said inspection circuit or said protection circuit is disposed in the vacuum area.

4. The liquid crystal display according to claim 1, further comprising:

a wall disposed between said array substrate and said counter substrate to surround said inspection circuit or said protection circuit; wherein an area surrounded by said wall is a vacuum area, and said inspection circuit or said protection circuit is disposed in the vacuum area.

5. The liquid crystal display according to claim 1, wherein said inspection circuit is a circuit that inspects lighting of said pixels.

6. The liquid crystal display according to claim 1, wherein said protection circuit is a short ring circuit.

7. The liquid crystal display according to claim 1, wherein the counter electrode shields the counter substrate from a leakage electric field generated by the inspection circuit or the protection circuit, so that the counter substrate is less likely to be influenced by the leakage electric field, which in turn suppresses uneven displaying in the display area.

8. A liquid crystal display of a lateral electric field type, comprising:

an array substrate having a plurality of pixels arranged in a matrix state;

a counter substrate disposed opposite to said array substrate; and liquid crystal enclosed between said array substrate and said counter substrate by a sealing material;

said liquid crystal display having a display area for an image and a frame area surrounding the display area;

said liquid crystal display further comprising:

an inspection circuit or a protection circuit disposed in said frame area of said array substrate; and a wall disposed between said array substrate and said counter substrate to surround said inspection circuit or said protection circuit between said sealing material and the wall; wherein an area surrounded by said wall and said sealing material is a vacuum area, said inspection circuit or said protection circuit is disposed in the vacuum area, said display area and said vacuum area surrounded by said wall and said sealing material are connected by a communicating channel, and depending on a volume change of said liquid crystal, said liquid crystal moves between said display area and said vacuum area through said communicating channel.

9. The liquid crystal display according to claim 8, further comprising:

a light shielding layer disposed at said counter substrate; wherein said light shielding layer is provided with a slit between said display area and said frame area, and said light shielding layer disposed in said display area and said light shielding layer disposed in said frame area are separated from each other by said slit.

10. The liquid crystal display according to claim 8, wherein said inspection circuit is a circuit that inspects lighting of said pixels.

11. The liquid crystal display according to claim 8, wherein said protection circuit is a short ring circuit.

12. A liquid crystal display of a lateral electric field type, comprising:

an array substrate having a plurality of pixels arranged in a matrix state;

a counter substrate disposed opposite to said array substrate; and liquid crystal enclosed between said array substrate and said counter substrate by a sealing material;

said liquid crystal display having a display area for an image and a frame area surrounding the display area;

said liquid crystal display further comprising:

an inspection circuit or a protection circuit disposed in said frame area of said array substrate; and a wall disposed between said array substrate and said counter substrate to surround said inspection circuit or said protection circuit; wherein an area surrounded by said wall is a vacuum area, said inspection circuit or said protection circuit is disposed in the vacuum area, said display area and said vacuum area surrounded by said wall are connected by a communicating channel, and depending on a volume change of said liquid crystal, said liquid crystal moves between said display area and said vacuum area through said communicating channel.

13. The liquid crystal display according to claim 12, further comprising:

a light shielding layer disposed at said counter substrate; wherein said light shielding layer is provided with a slit between said display area and said frame area, and said light shielding layer disposed in said display area and said light shielding layer disposed in said frame area are separated from each other by said slit.

14. The liquid crystal display according to claim 12, wherein said inspection circuit is a circuit that inspects lighting of said pixels.

15. The liquid crystal display according to claim 12, wherein said protection circuit is a short ring circuit.

* * * * *